Oct. 30, 1956  W. G. LANDWIER  2,768,533
CONTROL FOR CLUTCH AND VALVE ON WASHING MACHINES
Filed May 22, 1952  2 Sheets-Sheet 1
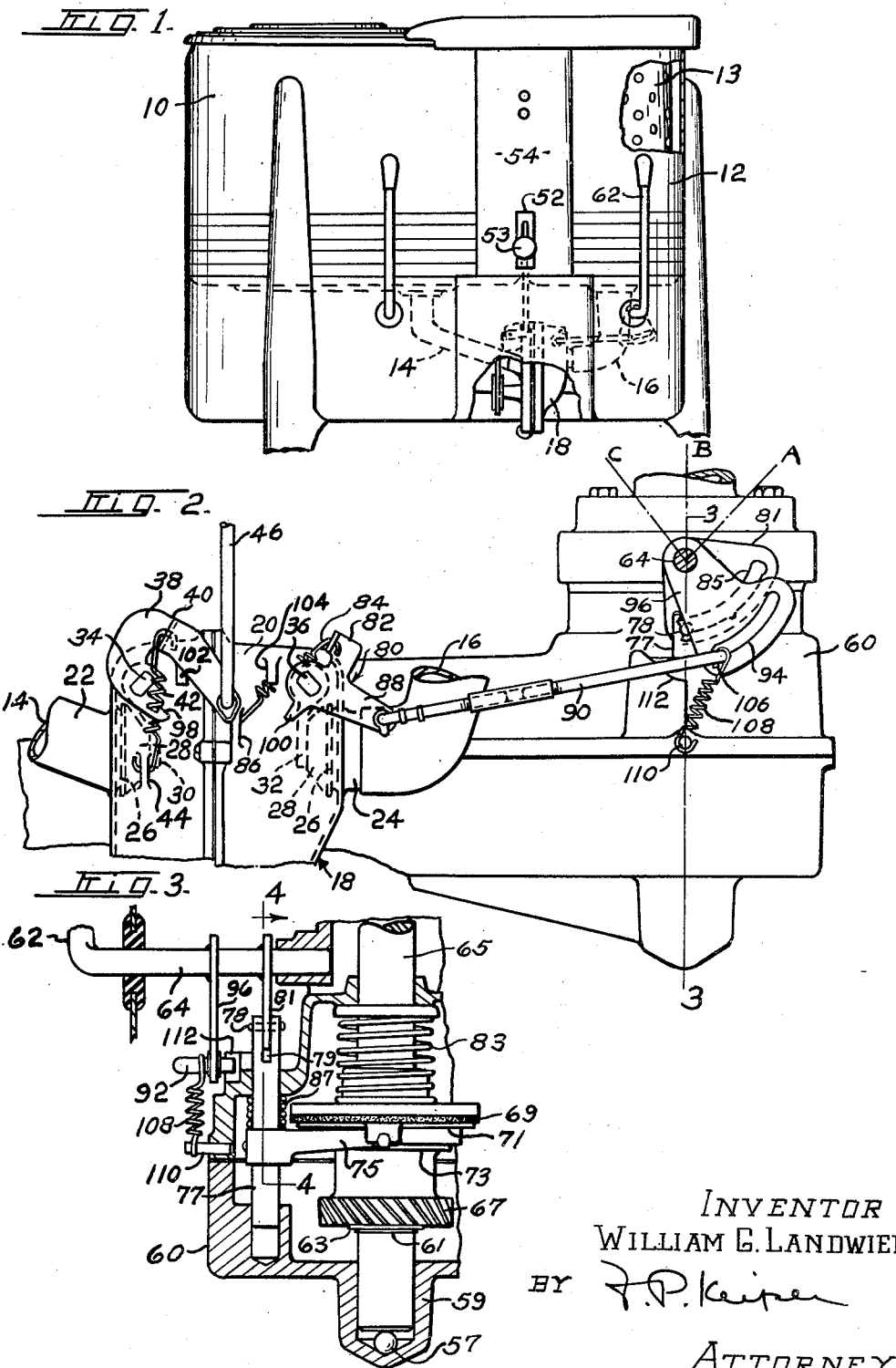
INVENTOR
WILLIAM G. LANDWIER
BY
ATTORNEY Oct. 30, 1956            W. G. LANDWIER            2,768,533
CONTROL FOR CLUTCH AND VALVE ON WASHING MACHINES
Filed May 22, 1952                                           2 Sheets-Sheet 2
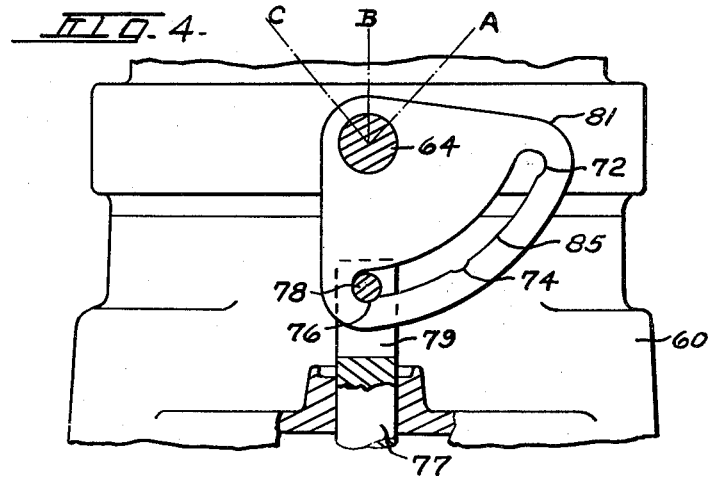
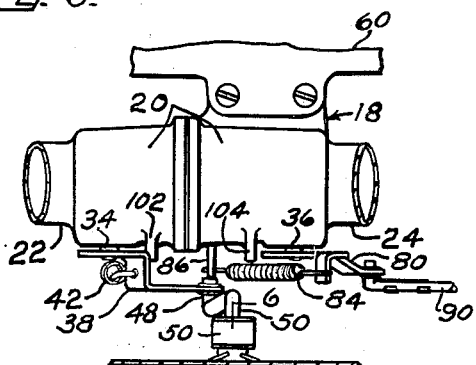
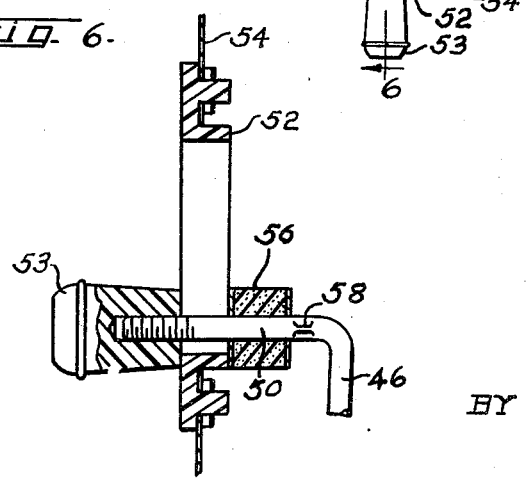
INVENTOR
WILLIAM G. LANDWIER
BY
ATTORNEY

United States Patent Office 2,768,533
Patented Oct. 30, 1956

2,768,533

CONTROL FOR CLUTCH AND VALVE ON WASHING MACHINES

William G. Landwier, Fayetteville, N. Y., assignor, by mesne assignments, to The Murray Corporation of America, Detroit, Mich., a corporation of Delaware Application May 22, 1952, Serial No. 289,328

1 Claim. (Cl. 74—471)

This invention relates to washing machines, and more particularly to a coordinated drain valve and centrifugal dryer control therefor.

In centrifugal extractor type washing machines, as generally disclosed in Patent No. 2,601,031, it has been the general practice to provide an extractor tub having a permanently open drain, for the prompt removal of extracted fluid. Such open drain prevents the use of the extractor tub for submerged rinsing prior to extraction. On the other hand, where a valve is provided for the outlet from such tub, as for example in application Serial No. 247,869, filed September 22, 1951, now Patent No. 2,669,932, there is always the possibility of commencing centrifuging while there remains in the tub, through failure to open the valve, sufficient water to result in a centrifugal discharge over the rim of the tub.

The present invention is directed toward combining the centrifugal dryer clutch control with a drain valve, whereby a unitary control is provided which will permit using the tub for submerged rinsing, but which will render certain that the drain valve is open before initiating centrifugal drying. The invention further has to do with providing in such a single control, suitable lost motion linkage to avoid overlapping of the valve opening movement with the clutch engagement movement of the same control. Additionally, the invention has to do with the simplification of the over-all control of a machine of the type described, affording utilization of an extractor tub drain valve without the apparent addition of any control therefor. Still further, the invention is directed to combining such a control with the clutch and brake shifter mechanism disclosed in application Serial No. 174,398, filed July 18, 1950, now Patent No. 2,660,278.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

Referring to the drawings, wherein like reference characters indicate like parts:

Figure 1 is a side elevational view with parts broken away, of a washing machine having the control system;

Figure 2 is an enlarged fragmentary view of the valve and centrifugal dryer mechanism and immediate control linkage therefor;

Figure 3 is a sectional fragmentary view taken on the line 3—3 of Figure 2;

Figure 4 is a sectional view taken on the line 4—4 of Figure 3;

Figure 5 is a top plan fragmentary view of the drain valve casing and valve controls and adjacent control panel; and Figure 6 is a sectional view through the control panel taken on the line 6—6 of Figure 5.

Referring to Figure 1, there is shown a two-tub extractor type washing machine having a large tub 10 for washing, and a small tub 12 for centrifugal extraction, in which there is positioned the usual centrifuge basket 13. The wash tub 10 and extraction tub are provided with drain outlets 14 and 16, respectively, which lead in the present disclosure to a combined valve and discharge pump assembly 18. Such assembly comprises an upper casing portion 20 constituting a valve chamber having nipples 22 and 24 for connecting to the respective tubs. Each of such nipples is provided with a valve seat 26 within the casing, adapted to be engaged by a conical resilient rubber-like valve element 28 carried on respective crank arms 30 and 32, which arms are mounted on rock shafts 34 and 36 projecting outside of the housing.

The rock shaft 34 is provided with a gooseneck lever 38, having an offset 40 for the reception of an over-center tension spring 42 extending to a casing ear 44. The lever may be activated by any suitable linkage as indicated in Figures 5 and 6, there being provided a direct control rod 46, having a bent end 48 pivoted in lever 38, and a bent end 50 riding in a guide slot frame 52 formed of plastic or other suitable material, and mounted in the panel 54. The bent end 50 may be provided with a knob 53 adapted to press lightly on the front of the guide frame 52, there being provided a resilient cushion 56 to the rear thereof suitably positioned by ears 58 to provide light frictional contact between the knob and cushion on the frame 52.

Referring to Figure 2, there is shown a fragmentary part of the transmission casing 60 within which is housed a drive for a vertical spindle to drive the centrifugal extractor basket 13 within the tub 12, all of which is well-known in the art, and illustrated, for example, in Patent No. 2,627,175. Such spindle is provided with a clutch and brake mechanism for starting and stopping rotation of the centrifugal extractor, and to actuate the clutch and brake, there is provided a control lever 62 having a connection with a control shaft 64 extending into the transmission casing 60 for actuating such brake and clutch. Herein, such details as appear essential respecting the spindle drive upon which the basket is supported are shown in Figure 3.

The spindle, indicated as at 65, has freely rotatably mounted thereon a constantly driven gear 67 having a clutch flange 73, adapted to engage a disk friction face 69, resiliently urged downward on spindle 65 by spring 83, but keyed for rotation with the spindle. The gear 67 is positioned on the shaft by a lock ring 61 recessed in an annular groove in the shaft and a washer 63. The lower end of the shaft 65 is journaled in a casing bearing 59, and rests on a thrust ball 57. The friction disk is adapted to be raised by the brake ring 71 out of engagement with the clutch flange 73, such brake ring being supported on a yoke 75 and laterally disposed slide rod 77, for a substantial portion of the travel, after which compression spring 87 performs this function alone.

The slide rod extends upwardly out of the casing 60 and is provided with a bifurcated end 79, adapted to receive a sector plate 81 rigidly secured to the shaft 64. The plate 81 is provided with an arcuate and spiral slot 85 acting as a cam, having radially outwardly disposed detent recesses 72, 74 and 76, adapted to engage a pin 78 extending across the spaced ends of the rod 77. The slot between recesses 72 and 74 is spiral and the slot acts as a lift for the rod 77, whereas the slot between recesses 74 and 76 is arcuate and acts as a dwell, the rod 77 being held in raised position. Thus, as the sector plate is rotated clockwise from the position C to the position B as is shown in Figure 2 or 4, the rod 77 makes no appreciable movement, the rod being in elevated position holding the brake disk 71 in frictional engagement with the brake lining 69, and also lifting the brake lining away from the end friction face of the clutch flange 73 against the spring 83. Upon further movement from position B to A, the spiral part of the slot engages the pin 78, and together constitute a cam means, lowering the shifter fork, allowing the brake disk 71 to separate from the friction lining 69, whereupon the friction lining is resiliently engaged with the end face of the friction flange 73. Thus, movement of the control lever from A to B uncouples the clutch and applies the brake, and further movement from B to C is in the nature of "lost motion." The recesses 72, 74 and 76 are of sufficient depth to hold the lever in any one of the three selected positions, A, B, or C, the compression spring 83 being effective to provide a downward thrust, together with spring 87, such latter spring acting alone when pin 78 engages recess 72.

As illustrated in Figure 2, the extractor tub drain valve, shown in closed position, is provided with a lever 80 secured to the valve shaft 36, such lever having an arm 82 to which is connected an over-center tension spring 84, the other end of which is attached to lug 86 on the casing 18.

A second arm 88 on the lever 80 is provided with a link 90 adapted to connect such lever with a sector-shaped lever 96 on the shaft 64, such link having at its other end a right angle bend 92, projecting through an arcuate slot 94 in the sector member 96. The sector member 96 is securely fastened to the shaft 64, so as to rotate angularly therewith. Both valve shafts 34 and 36 are adapted to rock from the closed valve positions shown to open valve positions where the ears 98 and 100 engage the valve casing stop lugs 102 and 104, respectively.

The end 92 of link 90 is adapted to nest in a radially outwardly disposed recess 106 in the end of the arcuate slot 94, such link end being lightly biased to rest in such slot by a tension spring 108, hooked at one end over the rod end 92 and attached at the other end to a pin 110 fixed to the casing 60.

The arcuate slot 94 is of about the same angular length as the arc between recess 74 and recess 72.

As the shaft 64, as viewed in Figures 2 and 4, is rocked clockwise, from position C to position B, the link 90 is moved to the left by reason of the rod end 92 being held seated in the recess 106. Through such motion, the valve shaft 36 is rotated from a closed to an open position. Further clockwise movement of the shaft 64 causes the end 92 of the link 90 to engage a cam 112 formed as a part of the casing 60, whereby the link end is moved first radially inward, to lift the end 92 from the recess 106, after which the link 90 remains stationary, while the end 92 rides in the slot 94, during movement of the control shaft from the clutch release brake-engaged position (B) to the clutch-engaged brake release position (position A).

By the arrangement thus shown, movement of the control shaft 64, through actuation of the lever handle 62, first causes the valve shaft 36 to swing to open position with respect to its valve, and thereafter, through the lost motion permitted by the riding of the link end 92 in the arcuate slot 94, permits the extractor clutch to be engaged while disengaging the brake. When the extractor is to be stopped by moving the control lever 62 from position A to B, the link end 92 rides in the arcuate slot 94, dropping into the recess 106 when position B is reached. Thereafter, movement to position C actuates the link 90, to close the extractor drain valve. The valve shaft 36 is securely held in open or closed position by the over-center spring 84.

By the arrangement thus provided, whenever the extractor is stationary, the extractor tub valve may be opened or closed, as desired, by suitable movement of the lever 62. On the other hand, if it be desired to set the extractor in motion, assurance is had that the drain valve is opened before the engagement of the extractor drive clutch. Thus, not only is a single control provided for performing two functions heretofore requiring separate controls, but an interlock is provided preventing operation of the extractor, except when the extractor drain valve is open.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

In a centrifugal extractor washing machine, a control shaft, a sector member having an arcuate overrunning slot fixed to said shaft, valve linkage having a valve actuating member adapted to ride in said slot, a radial recess in said slot, means for yieldingly biasing said member into engagement with said recess to actuate said linkage by rotation of said shaft, and stationary cam means adapted to engage said member to lift said member out of said recess, whereby said member rides in said slot upon rotation of said shaft, a second cam carried by said shaft having a cam slot having a spiral portion of an arcuate length in degrees not greater than that of said overrunning slot and an additional arcuate portion, clutch actuating follower means engaging said cam slot, the spiral portion of said cam slot being coordinated to actuate said clutch while said member rides in said overrunning slot, and the arcuate portion of said cam slot being adapted to engage said follower means when said member is actuated by engagement with said recess, whereby to actuate said valve and clutch independent of each other and in sequence only.

References Cited in the file of this patent
UNITED STATES PATENTS

| | | |
|---|---|---|
| 228,779 | Perkins | June 15, 1880 |
| 1,766,213 | Bock | June 24, 1930 |
| 1,803,383 | Defibaugh | May 5, 1931 |
| 1,950,976 | Dodge | Mar. 13, 1934 |
| 2,191,742 | Miller | Feb. 27, 1940 |
| 2,263,963 | Barry | Nov. 25, 1941 |
| 2,291,088 | Morganstern | July 28, 1942 |
| 2,326,377 | McBride | Aug. 10, 1943 |
| 2,500,368 | Lund | Mar. 14, 1950 |
| 2,660,278 | Landwier | Nov. 24, 1953 |